United States Patent [19]

Gallas

[11] Patent Number: 5,047,447

[45] Date of Patent: * Sep. 10, 1991

[54] MEDIUM INCORPORATING MELANIN AS AN ABSORBING PIGMENT FOR PROTECTION AGAINST ELECTROMAGNETIC RADIATION

[75] Inventor: James M. Gallas, San Antonio, Tex.

[73] Assignee: Photoprotecive Technologies Incorporated, San Antonio, Tex.

[*] Notice: The portion of the term of this patent subsequent to Oct. 6, 2004 has been disclaimed.

[21] Appl. No.: 453,023

[22] Filed: Dec. 20, 1989

Related U.S. Application Data

[63] Continuation-in-part of Ser. No. 105,632, Oct. 5, 1987, abandoned, which is a continuation-in-part of Ser. No. 739,556, May 30, 1985, Pat. No. 4,698,374, which is a continuation-in-part of Ser. No. 618,745, Jun. 8, 1984, abandoned, said Ser. No. 105,632, is a continuation-in-part of Ser. No. 88,029, Aug. 18, 1987, abandoned, which is a continuation of Ser. No. 837,852, Mar. 6, 1986, abandoned, which is a continuation of Ser. No. 739,756, May 30, 1985, abandoned, which is a continuation of Ser. No. 618,745, Jun. 8, 1984, abandoned.

[51] Int. Cl.$^5$ ................................................ C08J 3/00
[52] U.S. Cl. .................... 523/106; 359/359;
359/361; 359/350; 359/642; 359/722; 252/582;
252/583; 252/587; 252/588; 428/412; 428/441;
526/314; 526/259; 526/238.1; 527/201;
527/282; 527/203; 8/507; 8/509; 8/512; 8/673

[58] Field of Search .................. 350/1.1, 1.2, 1.7, 409, 350/417, 438, 444; 252/582, 583, 587, 588; 528/205, 206, 392; 526/238.1, 259, 314; 428/412, 441; 527/201, 202, 203; 523/106; 8/507, 509, 512, 678, 673

[56] References Cited

U.S. PATENT DOCUMENTS

| | | | |
|---|---|---|---|
| 2,822,339 | 2/1958 | Hagemeyer, Jr. et al. | 526/238.1 |
| 3,322,719 | 5/1967 | Pielstocker | 350/1.1 |
| 3,764,477 | 9/1973 | Lehmann et al. | 527/201 |
| 4,404,257 | 9/1983 | Olson | 428/412 |
| 4,419,405 | 12/1983 | Ashby et al. | 428/412 |
| 4,464,525 | 8/1984 | Vance | 528/392 |
| 4,650,605 | 3/1987 | Vance | 252/588 |

FOREIGN PATENT DOCUMENTS

| | | |
|---|---|---|
| 1389087 | 1/1965 | France . |
| 9071149 | 10/1974 | Japan . |
| 1060780 | 3/1967 | United Kingdom . |

OTHER PUBLICATIONS

Today—San Antonio, Jun. 1984.
The Merck Index (10th Edition, pp. 266, 827 and 1154).
Hach's Chemical Dictionary (4th Edition), pp. 413 and 698.
Karrer, Organic Chemistry, pp. 428, 429, 576. 577 and 579 (1950), Elsevier Publishing Co.

Primary Examiner—Joseph L. Schofer
Assistant Examiner—Alex H. Walker
Attorney, Agent, or Firm—Anastassios Triantaphyllis

[57] ABSTRACT

The present invention is directed to a medium incorporating melanin for radiation protection.

25 Claims, 1 Drawing Sheet

MEDIUM INCORPORATING MELANIN AS AN ABSORBING PIGMENT FOR PROTECTION AGAINST ELECTROMAGNETIC RADIATION

RELATED APPLICATIONS

This application is a continuation-in-part application of copending application Ser. No. 07/105,632, filed Oct. 5, 1987, abandoned which is a continuation-in-part application of Ser. No. 06/739,556, filed May 30, 1985, now U.S. Pat. No. 4,698,374, issued Oct. 6, 1987, which is in turn is a continuation-in-part application of application Ser. No. 06/618,745, filed June 8, 1984, now abandoned. Application Ser. No. 07/105,632 is also a continuation-in-part application of copending application Ser. No. 7/088,029, filed Aug. 18, 1987, now abandoned, which in turn was a continuation of application Ser. No. 6/837,852, filed Mar. 6, 1986, now abandoned, which was in a turn a continuation of application Ser. No. 6/739,756, filed May 30, 1985, now abandoned, which in turn was a continuation of application 6/618,745, filed June 8, 1984, now abandoned. This application is also related to copending application Ser. No. 07/255,905, filed Oct. 6, 1988. The copending applications are incorporated herein by reference.

FIELD OF THE INVENTION

This invention relates to the field of melanins and, more particularly, to the use of melanin as a pigment to provide ultra-violet, visible and near infrared absorption. Still more particularly, the invention relates to the use of melanin as a radiation absorbing pigment in opthalmic devices, protective eyewear, windows, packaging material, umbrellas, canopies, and other similar media suitable for providing protection from radiation.

BACKGROUND OF INVENTION

In recent years increasing attention has been given to the importance of protecting the eyes and skin from radiation emitted by artificial and natural light sources. Prolonged exposure of the eyes to reflected solar ultra-violet radiation is believed to result, for example, in the formation of cataracts and general tissue damage. Furthermore, attention has been given to the importance of protecting packaged material from such radiation to reduce the destabilization, degradation, decay or other undesirable effects on that material that may be caused by the radiation.

A variety of commercial optical filters have evolved to meet the threats posed by these radiation environments. Such optical absorption systems include sunglasses, contact lenses, aircraft and automobile windows, welders glasses and others.

In the case of sunglasses, two general types of materials are currently employed as practical absorbing components. Metallic films deposited onto plastic lens substrates are very effective sunscreens providing broad band attenuation of electromagnetic waves from the ultraviolet into the near infrared region of wavelengths. However two disadvantages are associated with this type of sunglass system. Manufacturing steps beyond the formation of the basic plastic lens are required and secondly, waves incident from the rear and reflected directly into the eye pose a new problem and require further manufacturing modifications.

Dyes and pigments comprise the second general class of optical absorbers. These molecular or polymeric elements are either deposited as thin films or are dispersed into the plastic matrix. U.S. Pat. No. 4,157,892 illustrates a method of coloring water-absorbable plastics. Disadvantages of this type of system are often the inability of the dye or pigment to absorb radiation sufficiently over all the ultraviolet wavelengths and a tendency to photodegrade. Photodegradation is particularly common to organic dyes and pigments.

Prior art does exist for melanin as a sunscreen; however, this prior art is restricted to the use of melanin as an ultraviolet protecting pigment in a cosmetic cream applied to the skin (see Japanese Patent-Kokai-74 71,149).

The use of melanin, an easily synthesized biopolymer, as a sunglass pigment, offers several advantages over the prior art. These advantages will become evident in the following description.

For the purpose of the present description, melanins are defined and classified as in the book entitled *Melanins*, by R. A. Nicolaus, published in 1968 by Hermann, 115, Boulevard Saint-Germain, Paris, France which work in its entirety is incorporated herein by reference. As defined by Nicolaus, melanins constitute a class of pigments which are widespread in the animal and vegetable kingdoms. While the name melanin in Greek means black not all melanins as pigments are black but may vary from brown to yellow. The melanins may be classified as follows: Eumelanins are derived from the precursor tyrosine (1):

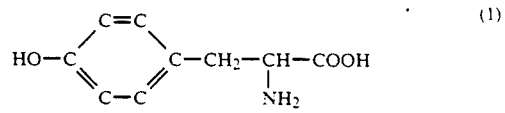

Phaeomelanins have as their precursors tyrosine and cysteine (2):

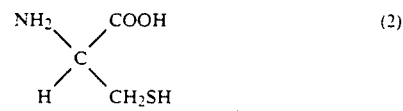

Allomelanins, the meaning of which is other melanins, are formed from nitrogen-free precursors, primarily catechol and 1,8-dihydroxynapthalene. Further information on Melanins is found and incorporated herein by reference on page 827, Monograph No. 5629 in The Merck Index (10th Ed. 1983). Quinones are the usual intermediates in allomelanin synthesis. The synthesis of melanins occurs in nature. Furthermore, melanin may be synthesized commercially or in the laboratory. An example of the synthetically produced catechol melanin and DOPA melanin are found in the article by Froncisz, W., Sarna, T., Hyde, James S. Arch. Biochem. Biophys. "Copper (2+) ion Probe of Metal-ion Binding Sites in Melanin Using Electron Paramagnetic Resonance Spectroscopy." I. Synthetic Melanins. (1980, 202(1), 289–303). That article is incorporated herein by reference. The catechol melanin is disclosed in the Froncisz et al. article as being produced as follows:

Catechol Melanin. A solution of 15 g of catechol in 3 L of deionized water was brought to pH 8 with ammonium hydroxide, and then air was bubbled through the stirred solution for four days. The resulting melanin was precipitated by addition of concentrated hydrochloric acid to bring the pH to 2, then washed with dilute HCl and dialyzed against deionized water for several days to remove H+ and Cl− ions. The concentration of the melanin suspension was estimated by drying an aliquot in vacuum over phosphorus pentoxide and weighing. Oxidized catechol melanin was prepared by adding 10 mL of $10^{-3}$ M potassium ferricyanide to 30 mg of melanin and incubating for 10 minutes. The suspension was then spun down, washed twice with deionized water and suspended in 5 mL of deionized water.

SUMMARY OF THE INVENTION

The present invention is directed to a medium for radiation protection utilizing melanin as an ultraviolet, visible and near-infrared absorbing pigment. The essential and distinguishing feature of the present invention is the specific use of melanin as the absorbing pigment in optical lenses or filters including sunglasses, protective eyewear, contact lenses, intraocular devices, windows, packaging material, umbrellas, canopies, and other media that are suitable for providing protection from radiation emitted from natural or artificial sources. The melanin may be applied to the surface of the media or may be incorporated into the matrix of the media or may be placed or "sandwiched" between portions of the media.

DETAILED DESCRIPTION

The following detailed description of the preferred embodiments of the present invention will be understood by reference to the accompanying drawings wherein.

Figure 1:
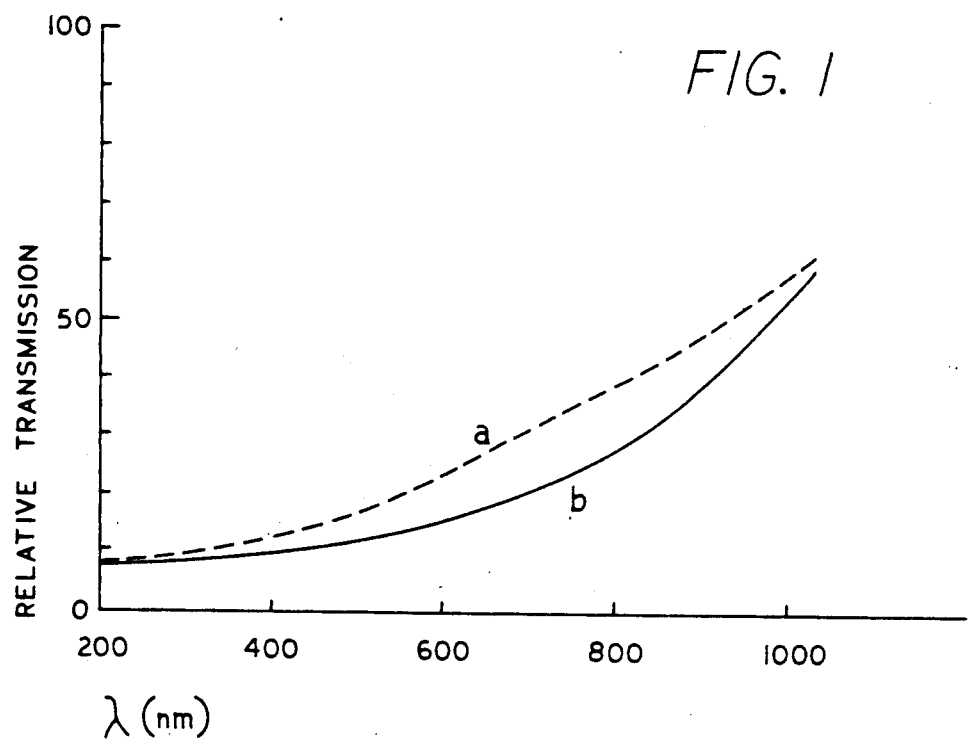
FIG. 1a is an optical transmission spectrum of a plastic lens containing melanin and is described further in Example 1 below.
FIG. 1b is an optical transmission spectrum of melanin, or a melanin coating and is described further in Example 2 below.

As set forth in more detail in Nicolaus' book, *Melanins*, the synthetic or natural melanins are the free-radical polymerization products of the melanin precursors. An illustration of the synthetic or natural melanins is the oxidation of tyrosine to DOPA, followed by the free-radical polymerization of DOPA to melanin. The allomelanins may be formed by the free-radical polymerization of a nitrogen-free melanin precursor such as catechol. Whatever the melanin precursor, the polymerization results in the formation of a polymer, melanin, whose exact number of units of melanin precursor are not known. Because of the number of reactive sites in the melanin precursor and its intermediates, this polymerization is heterogeneous and the result is an amorphous, highly irregular, three dimensional polymer whose structure is poorly characterized. Therefore, a given melanin is characterized primarily by its precursor and the spectroscopic properties of the melanin rather than by an exact determination of the structure and chemical formula of the melanin. Hence, a melanin is characterized as follows:

1. a polymer of a monomeric melanin precursor
2. a polymer whose monomeric precursors polymerize via a free-radical mechanism
3. a polymer with a broad band optical absorption spectrum as shown in FIG. 1
4. a polymer with a stable free-radical which is often studied through ESR spectrocopy
5. an amorphous, three dimensional, heterogeneous polymer of varying molecular weight.

In the present invention the preferred melanin precursors are DOPA and dopamine which form the eumelanins and catechol which forms an allomelanin respectively. The formula for DOPA (3), dopamine (4) and catechol (5) are as follows:

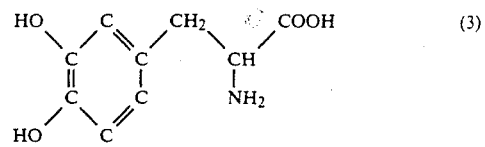

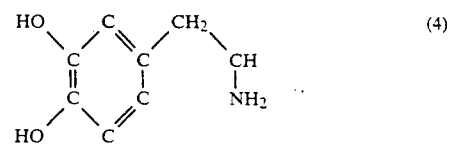

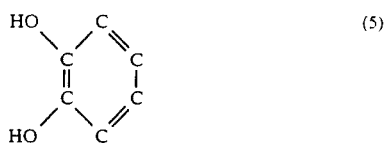

Other known melanin precursors which may be used in the present invention are 5,6-dihydroxyindole; leucodopachrome; tryptamine; serotonin; 5,6-dihydroxyindole-2-carboxylic acid; epinephrine; norepinephrine; tyrosine, adrenochrome; and 1,8-dihydroxynapthalene.

Heretofore, in preparing synthetic melanins oxygen has been used to initiate the free-radical polymerization in a base and water solution. However, applicant has found that it is possible to initiate this reaction using a free-radical initiator and to use other solvents. A preferred free-radical initiator is benzoyl peroxide. Other free-radical initiators are di-tert-butyl peroxide and di(1-cyano-1-methyl ethyl) diazene (azobisisobutyronitrile). The choice of the free-radical initiator is determined by its solubility properties and the desired reaction kinetics. Other initiator systems besides peroxides and azo compounds include redox pairs, photochemical systems, perborates, percarbonates and radiation. The typical solvent for preparing the synthetic melanins is water, however, applicant has found that organic solvents such as dimethyl sulfoxide (DMSO), chloroform, acetonitrile, toluene and 1,2-dichloroethane may also be used.

The melanins of the present invention are pigments which are all the polymerization reaction products of the melanin precursors used, which as polymerization reaction products are amorphous, highly irregular polymers. These polymers may have a number of varying structures according to the present invention; however, the polymer or mixture thereof is characterized as having the broadband optical absorption spectrum as shown in FIGS. 1a and 1b. Other graphs showing the optical absorption of melanin and a comparison of its optical absorption with that of other substances can be found in the aforementioned *Melanin* book by Nicolaus. From those graphs, it is apparent that melanin absorbs radiation having wavelengths as high as 2500 nanometers and as low as approximately 200 nanometers. Those graphs and the related information contained in that book are incorporated herein by reference. The aforementioned figures and graphs show that the amount of radiation transmitted through the melanin continuously and uniformly decreases as the wavelength of the radiation decreases from higher to lower wavelengths or, alternatively, that the amount of radiation absorbed by the melanin continuously and uniformly increases as the wavelength of the radiation decreases from higher to lower wavelengths. This characteristic of the melanins as utilized in the present invention is very important in that the absorption characteristics are very similar to the action spectrum for retinal damage. In fact, an essential feature of the present invention is that the absorption spectrum associated with melanin is very similar to the action spectrum for retinal damage. More particularly, it is known that although the cornea and lens absorb most of the ultraviolet rays from the sun, there is still a range of wavelengths between 400 nm and 550 nm which reach the retina and cause photochemical damage. The probability, amount or severity of this damage increases exponentially as the wavelength is decreased from the higher wavelengths toward 400 nm. This correlation between retinal damage and wavelength is defined herein as the action spectrum for retinal damage. Therefore, it is apparent that the absorption spectrum of melanin is very similar to the action spectrum for retinal damage or, alternatively, that the percentage of radiation absorbed by melanin increases in the wavelength regions wherein the potential of retinal damage increases.

Relatively few of the sunglass manufacturers have managed to produce lenses which filter out ultraviolet radiation and, of those, most cut out the ultraviolet wavelengths abruptly, while allowing the region between 400 nm and 550 nm to be transparent. Therefore an optical lens comprising melanin which is placed in front of or inside the eye would not only filter out radiation damaging to the retina, but it would also filter out the wavelengths in the proper proportions. Furthermore, any melanin containing lens placed in front of the eye would also offer radiation protection to the cornea and the lens thereof.

It is apparent that the aforementioned advantages of utilizing melanin are not limited to opthalmic lens systems only and that melanin may be utilized in connection with any media that are suitable for preparing apparatus, devices or substances for providing protection from radiation. Accordingly, melanin may be utilized in connection with any lens systems or similar devices such as opthalmic devices including plastic or glass sunglasses, protective eyewear such as welders or skiers masks or goggles, and hard (hydrophobic) or soft (hydrophilic) contact or intraocular lenses; glass or plastic windows such as automobile, building or airplane windows; glass or plastic packaging material such as beverage and food containers; thin plastic sheets; umbrellas; canopies; and other similar devices or substances suitable for the protection of humans or radiation-sensitive substances from radiation. With respect to opthalmic lenses it should be understood that those lenses may be prepared with or without optical prescriptions to correct visual defects.

In the case of hard or hydrophobic lenses the melanin that is incorporated into the lens or on the interior surface of the lens, as hereinafter described, may be used as a superoxide dismutase. More particularly, it is believed by certain authorities in the field, that photochemical damage to the cornea is promoted by oxygen that is present in the cornea or in its vicinity. That oxygen dependence has been disclosed by Zuchlich, Photochem. Photobiol., Volume 25, pages 133-135 (1977). Furthermore, it is believed that when biological molecules are exposed to short wavelength ultra-violet and blue radiation, reactions may occur with oxygen to produce superoxide. Superoxide is also formed by the reaction of oxygen with free melanin radicals that are produced when melanin absorbs light. The term superoxide as used herein is defined as the radical anion of molecular oxygen and is symbolized as $O_2^-$.

It is believed that superoxide is extremely reactive and harmful to biological tissue. Melanin has the ability to react with the superoxide, thereby preventing it from damaging the cornea and/or the lens of the eye. Melanin acts as a superoxide dismutase, i.e., a chemical agent that renders the superoxide harmless through chemical reaction. The melanin is particularly suited as a superoxide dismutase, not only because of its chemical structure, but also, because of the chemical properties of the superoxide. More particularly, superoxide can function either as a chemical oxidant or as a reductant. Because melanin is a redox polymer it may function in a similar fashion. Accordingly, superoxide is reduced by melanin through one reaction and is oxidized by melanin through another reaction.

The reduction by melanin reaction is:

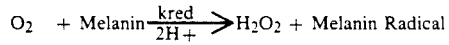

The oxidation by melanin reaction is:

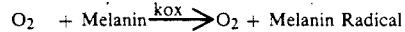

Because the hydrogen peroxide being produced by the reduction of superoxide by melanin tends to bleach the melanin and to oxidize the cornea, it is preferred that an agent be present to decompose the hydrogen peroxide to oxygen and water. Such an agent is copper in the form of ions ($CU^{++}$) bound to the melanin polymer as ligands or chelates. These ions decompose the hydrogen peroxide to oxygen and water. Accordingly, one may prevent the bleaching of the melanin in the lens by incorporating those ions into the lens and by bathing the lens in a copper sulphate solution to replenish the $CU^{++}$ ions that are being converted to $CU^+$ ions. This solution would also function as a bacteriostat for the lens.

Other scavenging agents or superoxide dismutases may also be used in connection with a hydrophobic contact lens to scavange the superoxide when the hydrophobic contact lens is placed on the eye. Examples of such superoxide dismutases include, but are not limited to, superoxide dismutases listed on page 1348 of the 1989 catalog of Sigma Chemical Company, entitled Biochemical Organic Compounds for Research ad Diagnostic Reagents (hereinafter the "Catalog"). The listed superoxide dismutases therein are extractions from bovine (cow) erythrocytes, extractions from bovine kidney, and extractions from bovine liver. These extractions are commercially available in free form or chemically bonded to polyethylene glycol. The sections of the Catalog referrring to superoxide dismuteses are incorporated herein an are made a part hereof by reference.

As discussed herein, a melanin may be incorporated in the lattice of the lens and/or applied to the surface of the lens to act as a radiation absorbing pigment and to protect the eye from such radiation. In order to scavange the superoxide that is present on the surface of the eye, a melanin and any other superoxide dismutase may be applied to the surface of the lens and/or may eincorporated in the lattice of the lens to have sufficient physical and chemical contact with the superoxide. The superoxide which is present on the surface of the eye is able to reach or make contact with the superoxide dismutase by direct contact with the superoxide dismutase that is present on the surface of the lens or by diffusion through the channels or network existing within the structure of the hydrophobic contact lens. Upon contact, the superoxide dismutase scavanges the superoxide as described above. For example, a hydrophobic contact lens may be dipped in an aqueous or other solution of a melanin or in a aqueous solution of the superoxide dismutases which are extractions of bovine erythrocytes, kidney or liver to physically attach the superoxide dismutase to the surface of the lens. Similarly, a superoxide dismuatse such as the ones described above may be physically or chemically incorporated in the lattice of the lens and/or chemically or physically attached to the surface of the lens. In all cases, the available reactive sites of the superoxide dismutase react with the superoxide to scavange the same as described above.

It should be understood that the term "solid" or "material in the solid state" as used herein shall mean all material who have structural and mechanical integrity and whose structure remains fixed and shall include glass and plastic solid devices such as opthalmic devices, windows, containers, umbrellas, canopies, etc., flexible plastic films such as wrap, etc. The term "solid" or "material in the solid state" does not include materials that are comprised of particles that are not connected so as to form a continuous, solid, structurally fixed medium having mechanical integrity. An example of material not included in the term "solid" or "material in the solid state" as used herein are creams and other liquid substances.

The present invention is more specifically shown by the following examples:

A first method according to the present invention in which the melanin pigment may be incorporated into a lens or similar medium including, but not limited to, opthalic devices, windows, packaging material, or any other radiation protection device made out of polymeric material, is to polymerize the melanin precursor simultaneously with a monomer which is polymerized by free-radical polymerization to form the polymer. In this embodiment the melanin pigment is uniformly dispersed within the plastic medium, layer or lens. For ease of incorporating the melanin precursor it is preferred to use a liquid monomer to form the lens or similar medium system and such monomers are diethylene glycol bis(allyl-carbonate), otherwise known as CR-39, a trademark product of PPG, styrene, methylmethacrylate or any other monomer suitable for the preparation of sunglasses, contact lenses, intraocular lenses, windows, packaging material or any other radiation protection devices such as umbrellas, canopies, etc.

In the case of a lens system, the liquid monomers polymerize by free radical polymerization and yield a polymer which is a clear, transparent plastic suitable for an optical lens when polymerized in the absence of other materials or in other words in the presence of the monomer per se. The melanin is dispersed in the lens system in a non-aggregated form. Although the lens may be used primarily for opthalmic devices, it may also be used in connection with windows, certain packaging material and other similar devices. Although the lens may be used primarily for opthalmic devices, it may also be used in connection with windows, certain packaging devices and other similar devices.

In the simultaneous polymerization of both the liquid monomer and the melanin precursors of the present invention, a preferred method is to add the melanin precursor to the liquid monomer while providing good mixing. To this mixture is added the free-radical initiator. The mixture is maintained at a temperature between 50° and 60° C. until the solid polymers are formed. In general, the greater the concentration of melanin precursor the greater the concentration of free-radical initiator is required for the simultaneous polymerization. Using 10 ml of CR-39 and 55° to 60° C. as a standard, applicant has found that, if the ratio of free-radical initiator to melanin precursor is maintained at about 10:1 by weight that simultaneous polymerization occurs.

EXAMPLE 1

A melanin-plastic using the melanin precursor catechol may be prepared as follows: Dissolve 400 mg of benzoyl peroxide into 10 ml of diethylene glycol bis(allyl carbonate) ("CR-39") at 50 degrees celsius, stirring continuously until the benzoyl peroxide is fully dissolved. Then add 30 mg of catechol and heat for one day; heat an additional two days at 65 degrees celsius, keeping the sample under a nitrogen atmosphere during the heating. The result is a clear and transparent solid lens with an amber color having melanin in a non-aggregated form uniformly incorporated therein. The solid is then cured in a vacuum oven at 110 degrees celsius for two hours. The relative transmission for the amber colored solid, of thickness 40 mm, is shown in FIG. 1a. This transmission spectrum illustrates the essential feature of melanin incorporated into an optical lens system for the purpose of radiation protection: that is, a uniform reduction in transmittance across the ultraviolet, visible and near infrared wavelengths, with greatest reduction in transmission occurring at the shorter wavelengths where the radiation is most damaging to biological molecules and tissue. An additional feature of this product is its photostability. Samples prepared as described in Example 1 were placed in direct sunlight and open to the atmosphere continuously for a period of 10 weeks during which the daily average solar intensity peaked midday at approximately 850 watts per square meter. There is no discernible discoloration. This feature is quite uncommon for the case of organic pigments. Finally an important advantage of this pigment lens system is that it requires negligibly more effort than the manufacture of the lens without the pigment.

EXAMPLE 2

35 mg of dopamine and 40 micro-liters of triethylamine is added to 10 ml of diethylene glycol bis(allyl carbonate) "CR-39" at 55 degrees centigrade and stirred for approximately one hour (this represents a saturated solution); 350 mg of benzoyl peroxide is then dissolved and the system is heated at 65 degrees for approximately 30 hours until a solid amber colored plastic is formed. The product is then cured at approximately 100 degrees for one hour in a vacuum oven. The optical absorption spectrum is similar to that of melanin (formed in the standard manner).

Figure 2:
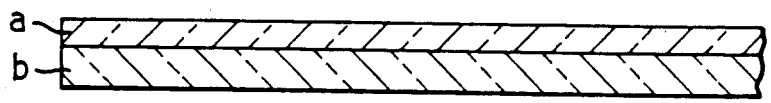
FIG. 2 is a drawing illustrating a transparent plastic or glass medium or lens substrate labeled "b" and a coating of melanin labeled "a" which covers said substrate "b"

In another method of the present invention, the melanin is applied to the surface of the lens or similar medium including, but not limited to, a sunglass, a contact lens, an intraocular device, a protective eyewear, a window, a packaging material or any other polymeric plastic or glass protective device, as a coating. This configuration is illustrated in FIG. 2. The layer labeled "a" is meant to be the melanin coating and the layer labeled "b" is meant to be the lens or similar medium substrate. The configuration may be achieved by first preparing a melanin solution as described earlier. In the case of a small lens, drops of the melanin are then placed onto a clean transparent lens surface and the solvent is then allowed to evaporate, leaving behind a uniform melanin film. Similar techniques may be used to place the melanin on other lenses or similar media.

The melanin is prepared by any of the usual methods for melanin preparation. In these methods the typical solvent is water, however, it has been found that organic solvents such as dimethyl sulfoxide (DMSO), chloroform, acetonitrile, toluene and 1,2-dichloroethane may also be used.

EXAMPLE 3

A melanin coated-glass lens system using the melanin precursor DOPA is prepared as follows: 1 gram of DOPA is dissolved into 200 ml of water. 50 ml of potassium phosphate (0.025M) and sodium phosphate (0.025M) buffer solution is then added and the pH is then adjusted to 7.5. Air is then bubbled into the stirred solution for three days. The black suspension is then extensively dialyzed and the concentration of the melanin is increased by allowing the water to evaporate by a factor of 0.1 of the original volume. A glass lens substrate is then made hydrophilic by treating it with a hot solution of chromic acid, followed by a rinse with deionized water. Several drops of the concentrated melanin suspension are then allowed to spread over the glass surface. The system is allowed to slowly dry, leaving a solid, clear and transparent melanin film wherein the melanin is in a non-aggregated form. The optical density of this film is shown in FIG. 1b and is similar to that of FIG. 1a.

Figure 3:
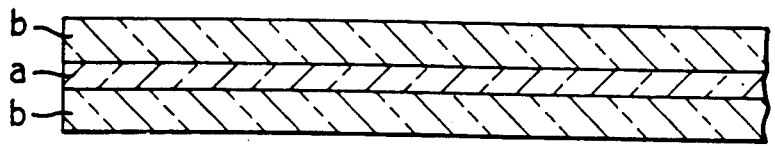
FIG. 3 is a drawing illustrating a coating or film of melanin "a" sandwiched between transparent plastic or glass media or lens substrates labeled "b".

In another embodiment a melanin film is formed by first dissolving a melanin precursor in an organic solvent or in water; a free-radical initiator is then added and heat is added to synthesize the melanin. This intermediate product is a melanin solution or suspension. The suspension is then mixed with a transparent polymer or plastic which serves as a binder or as a binder/adhesive. The solvent is then evaporated having served is means of dispersing melanin in the binder/adhesive. A suitable binder/adhesive is the common epoxy resin and a melanin may be dispersed in the epoxy resin as described. Thereafter, the hardener is then combined with the epoxy/melanin liquid to form a uniform liquid mixture which is then immediately sandwiched between two parallel transparent lenses, or similar media, thereby forming a melanin/epoxy resin mixture as illustrated in FIG. 3. By this method a melanin film is produced which also acts as an adhesive to join the parallel lenses or media portions. This method of incorporating melanin into a medium may be used to form melanin containing opthalmic devices, windows, packaging devices or other similar radiation protection devices.

EXAMPLE 4

500 mg of dopamine and 0.12 ml of triethylamine is added to 10 ml of chloroform to form a saturated solution; approximately 250 milligrams of benzoyl peroxide is added to the system; the system is then allowed to react at room temperature for 24 hours to form a concentrated melanin solution. The solution is then filtered and mixed with about 2 ml epoxy resin. The chloroform is then removed from the product by evaporation leaving melanin dispersed in epoxy resin. Epoxy catalyst, or hardener is added and the system is slowly stirred to produce an even color and drops of the product are deposited onto either glass or plastic lenses; an identical glass or plastic lens is placed over the melanin colored epoxy drops. In this way the epoxy serves to bind the melanin and adhere together the plastic or glass lenses.

In another method, melanin is prepared by dissolving a melanin precursor and a free radical initiator in an organic solvent such as acetonitrile. By using relatively large concentrations of initiator one may form small molecular weight melanin. This is essential in preventing the aggregation of the melanin when it is necessary to form a concentrated mixture of melanin for dispersion in the adhesive. The melanin product is mixed with commercially available UV glue such as "Loctite." The mixture is then placed between two opthalmic lenses, two window sheets, portions of similar media, etc. The sandwiched product is placed in the path of a UV light to cure the adhesive and lock it in place.

EXAMPLE 5

12 grams of catechol and four grams of benzoyl peroxide were dissolved into 100 milliters of acetonitrile. The solution was heated in an apparatus with a condenser at 60° C. for 24 hours. After 24 hours, the solution was cooled and then filtered. Following the filtered solution was concentrated by allowing approximately two-thirds of the solvent to evaporate and the concentrated solution was filtered with 0.2 micron millipore filters. The resultant product was then mixed with a commercially available UV curing glue which is known as "Loctite 350." The resultant mixture was a melanin containing glue. The mixture was then placed between two identical lenses. The lenses were pressed against each other. The resultant lens was then placed in the path of a UV light beam which cured the adhesive and locked in place the melanin between the lenses.

EXAMPLE 6

2.6 grams of benzoyl peroxide were dissolved into 150 ml of acetonitrile. The solution was heated to 65° C. Then, 6.0 grams catechol monomer was dissolved in the solution. Then, 1.5 ml of triethylamine was added to the solution and the solution was continuously heated at 65° C. for 16 hours. At the end of that period, the solution was cooled and then filtered with a 0.4 micron filter paper. The filtered contents, which was a low molecular weight melanin solution were poured into open dishes and the acetonitrite was allowed to evaporate. After approximately two days, most of the acetonitrile evaporated and the remaining product in the dishes was a thick, black, nonaggregated concentrated low molecular weight melanin solution.

One (1) part of the non-aggregated melanin solution was added to approximately three (3) to four (4) parts (by volume) of "Loctite 350" ultra-violet or UV curing adhesive. The mixture was mixed slowly and thoroughly and the bubbles formed were allowed to diffuse outward for one (1) day. A small amount of the resultant melanin adhesive mixture was placed between identical glass lenses. UV light of 350 nm was applied to the lenses until the lenses bonded. The lenses were then heat treated in an over at about 140° C. for approximately 6 to 8 hours.

Another method for preparing a melanin containing medium and for incorporating the melanin into a medium suitable for providing protection from radiation entails the preparation of a very thin film or sheet of plastic containing melanin. The film may be affixed to the surface of a lens, a window or similar apparatus by using an adhesive. Furthermore, the film may be placed or laminated between two lenses, window sheets or similar devices by using an adhesive. Furthermore, the melanin-containing sheet or film may be placed between two glass lenses or similar media under heat and pressure (autoclaving), whereby the melanin sheet may act as a binder. Furthermore, the film may be used alone as a radiation protection device in packaging or similar applications. Melanin-containing thin sheets may be prepared by two general methods.

One method for preparing thin plastic sheets incorporating melanin entails first, preparing melanin in a solvent which is capable of dissolving the plastic material to be used for the production of the film followed by dissolving the plastic material in the solution. The solution is then poured into a flat, chemically inert surface and heated. The solvent is allowed to evaporate and the resultant product is a thin transparent plastic sheet or film containing melanin.

Another method for preparing thin melanin-containing plastic sheets entails the synthesis of a low molecular weight melanin in a solvent, which does not dissolve the plastic to be used as a transparent optical sheet, window or radiation absorbing device, such as acetonitrile. The plastic sheet, such as a polyvinyl chloride plastic sheet, is bathed into the melanin-acetonitrile solution under heat and pressure. The small particle melanin diffuses into the pores of the plastic and becomes entrapped. After a period of time the sheet is removed and the resultant product is a plastic clear and transparent sheet having melanin incorporated therein. The darkness of the sheet can be varied by varying the concentration of the melanin in the solution. Furthermore, the rate of diffusion of the melanin particles can be increased by increasing the temperature.

EXAMPLE 7

Three (3) grams of benzoyl peroxide and ten (10) grams of dopamine were added to fifty (50) milliliters of chloroform and heated to 55° C. for 24 hours with an apparatus having a condenser. The product was then filtered with 0.2 micron millipore filters. Then, three (3) grams of polymethymethacrylate were dissolved in the filtered solution and the resultant transparent solution was poured onto a flat "Teflon" coated plate. The solvent was allowed to slowly evaporate. The resultant product was a thin transparent plastic sheet similar to material being marketed under the trademark "Saran Wrap" in appearance and having a brown to amber color. The sheet was then placed between two identical optical lenses and glued thereto with an adhesive to form a lens.

EXAMPLE 8

2.6 grams of benzoyl peroxide was dissolved into 150 grams of acetonitrile and the solution was stirred. 0.6 grams of catechol was then added to the solution followed by the addition of 1 milliliter of triethylamine. The solution was heated to 60° C. and stirred for 24 hours. The final product was filtered to produce a dark melanin-acetonitrile solution with the melanin having a low molecular weight. Thin sheets of polyvinyl chloride having a thickness of less than one (1) millimeter were bathed in the above solution for 24 hours at room temperature and were then removed. The result was an optically clear, transparent, melanin colored thin sheet of polyvinyl chloride.

Another method for the preparation of a lens entails first mixing melanin with a monomer and polymerizing the monomer to form a polymer containing melanin. Prior to polymerizing the monomer, it is preferred that the melanin be coated or sequestered by the monomer to prevent the melanin from interfering with the polymerization of the monomer. This coating or sequestration is achieved by utilizing appropriate coupling agents that activate and promote it. In a typical application, previously formed melanin in a solvent such as acetonitrile, is mixed with a monomer such as diethylene glycol (bis) allyl carbonate ("CR-39"). Then, a coupling agent such as dicylcohexyl carbodiimide or other carboxyl or activating reagent such as carbodiimides is added to activate the sequestration of melanin by the monomer. The monomer/melanin solution containing the sequestered melanin may be stored at a relatively low temperature such as 4° C. for the preparation of lenses at a later time or it may be heated to form a lens through polymerization. In this method the color of the lens and the degree of radiation protection can be adjusted by adjusting the amount of melanin.

EXAMPLE 9

A solution of 5 grams of acetonitrile and 4 grams of melanin was formed. The solution was then added to 193.4 grams of diethylene glycol (bis) allyl carbonate ("CR-39") monomer in a glass beaker. 4 grams of dicylcohexyl carbodiimide coupling agent was added in 250 milligram quantities. The solution was left undisturbed for approximately 10 to 12 hours. Then, the solution was filtered by vacuum through a fine Buckner filter funnel to remove a precipitate that was formed leaving a dark concentrated liquid product. One part of that product was mixed with three parts of CR-39 liquid monomer. Then, 10 ml of the mixture were mixed with 400 milligrams of benzoyl peroxide. The mixture was then heated at 70° C. for 24 hours to form a melanin-containing lens.

Another method involves dispersing melanin promoter such as catechol or L-dopa or dopamine melanin into a melted liquid plastic.

EXAMPLE 10

This is a theoretical example. 5 milligrams of previously formed melanin from catechol was dispersed in 10 milliliters of liquid melted polycarbonate plastic. The mixture was heated under nitrogen until a homogenous mixture was formed.

From the foregoing description, the principal advantages of melanin as an absorbing pigment in an optical lens or any other apparatus for radiation protection are:

a. melanin is resistant to light, thermal and chemical degradation;

b. melanin provides broad band optical absorption; this covers the entire solar spectrum (See FIG. 1);

c. the melanin absorptivity increases steadily for the shorter (more damaging) wavelengths (See FIG. 1);

d. the increase in the melanin absorptivity for the shorter wavelengths is an optimum for protection of the retina against radiation damage; that is, the shape of the melanin absorption spectrum is similar to the shape of the retina damage spectrum;

e. because of its structure, melanin is able to effectively stabilize and accommodate free-radicals; such free-radicals can be induced by heat or light in molecules nearby the melanin macromolecule and can then transfer to the melanin structure for stabilization; without such an avenue the highly reactive free-radicals would react and lead to chemical degradation; and f. melanin is photochromic; that is light can induce immediate darkening of melanin; this darkening may represent a reversible oxidation of the polymer with free radical intermediates.

While the invention has been described herein with reference to certain specific materials, procedures and examples, it is understood that the invention is not restricted to the particular materials, combinations of materials and procedures selected for the purpose of illustrations. Numerous variations of such details can be employed by those skilled in the art within the scope of this invention which is defined by the appended claims.

What is claimed is:

1. An apparatus for absorbing radiation emitted from natural or artificial sources, comprising:
   a solid material or a material being in its solid state; and
   melanin being connected with the material, the material and the melanin being transparent.

2. An apparatus according to claim 1 wherein the melanin is formed from the polymerization of a melanin precursor.

3. An apparatus according to claim 1 wherein the apparatus is an opthalmic device.

4. An apparatus according to claim 3 wherein the apparatus is a sunglass.

5. An apparatus according to claim 3 wherein the apparatus is a hard or hydrophobic contact lens.

6. An apparatus according to claim 3 wherein the apparatus is an intraocular device.

7. An apparatus according to claim 1 wherein the apparatus is a packaging device.

8. An apparatus according to claim 1 wherein the apparatus is a plastic film.

9. An apparatus according to claim 1 wherein the apparatus is a window.

10. An apparatus according to claim 1 wherein the apparatus is an umbrella.

11. An apparatus according to claim 1 wherein the apparatus is a canopy.

12. An apparatus for absorbing ultra-violet, visible and infrared radiation, comprising:
    a solid glass or plastic substrate; and
    melanin being adhered to the glass or plastic substrate.

13. An apparatus according to claim 12 wherein the apparatus is transparent.

14. An article of manufacture prepared by a process comprising the steps of:
    applying a non-aggregated melanin to the surface of a transparent solid glass substrate or a transparent solid plastic substrate.

15. An article of manufacture according to claim 14 wherein prior to the applying step, the melanin is mixed with an adhesive.

16. An apparatus according to claim 14 wherein the applying steps includes the steps of:
    incorporating the melanin into a film; and
    adhering the film to the surface of the substrate.

17. An apparatus according to claim 1 wherein the melanin is non-aggregated.

18. An apparatus according to claim 1 further including an adhesive for connecting the melanin with the material.

19. An apparatus prepared by a process comprising the steps of:
    mixing a non-aggregated melanin with an adhesive to form a mixture; and
    applying the mixture on the surface of a first solid substrate.

20. An apparatus according to claim 19 wherein the process further includes the step of placing a second substrate on top of the mixture whereby the mixture is placed between the first and second solid substrates.

21. An apparatus prepared by a process comprising the steps of:
    mixing non-aggregated melanin with a melted polycarbonate to form a mixture; and
    heating the mixture.

22. An apparatus prepared by a process comprising the steps of:
    mixing melanin with a monomer suitable for the formation of a polymer; and
    polymerizing the monomer in the presence of the melanin to form a melanin-containing polymer.

23. A hydrophobic contact lens for placing on an eye comprising:
    a polymeric material; and
    melanin being attached to the polymeric material for scavenging a superoxide when the lens is placed on the eye.

24. A lens according to claim 23 wherein the melanin is incorporated in the lattice of the lens.

25. A lens according to claim 23 wherein the melanin is on the surface of the lens.

* * * * *